United States Patent [19]
Eckardt

[11] Patent Number: 5,937,367
[45] Date of Patent: Aug. 10, 1999

[54] METHOD FOR TESTING A MEMORY CHIP, DIVIDED INTO CELL ARRAYS, DURING ONGOING OPERATION OF A COMPUTER WHILE MAINTAINING REAL-TIME CONDITIONS

[75] Inventor: Horst Eckardt, Munich, Germany

[73] Assignee: Siemens Aktiengesellschaft, Munich, Germany

[21] Appl. No.: 08/963,590

[22] Filed: Nov. 4, 1997

[30] Foreign Application Priority Data

Nov. 14, 1996 [DE] Germany .................. 196 47 159

[51] Int. Cl.⁶ .................................................. G06F 11/00
[52] U.S. Cl. ................. 702/117; 371/10.2; 371/10.3; 371/21.1; 365/201; 365/230.03
[58] Field of Search .................... 702/117, 10.2; 371/10.3, 21.1, 21.2, 21.3; 365/189.01, 200–201, 230.01, 230.03; 395/183.18, 183.01, 182.09

[56] References Cited

U.S. PATENT DOCUMENTS

| | | | |
|---|---|---|---|
| 4,586,178 | 4/1986 | Bosse ................................... | 371/10.3 |
| 5,128,941 | 7/1992 | Russell .................................. | 371/2.2 |
| 5,134,616 | 7/1992 | Barth, Jr. et al. ..................... | 371/10.3 |
| 5,550,394 | 8/1996 | Sukegawa et al. ..................... | 365/200 |
| 5,715,253 | 2/1998 | Kim et al. .............................. | 371/10.3 |
| 5,742,613 | 4/1998 | MacDonald ........................... | 371/10.3 |
| 5,748,872 | 5/1998 | Norman ............................. | 395/182.09 |

OTHER PUBLICATIONS

R. Nair, S.M. Thatte, J.A. Abraham, Efficient Algorithms for Testing Semiconductor Random–Access Memories. IEEE Trans. on Comp. C27,6 (1978), pp. 572–576.

M. Franklin, K.K. Saluja, Hypergraph Coloring and Reconfigured RAM Testing, IEEE Trans. on Comp. 43, 6 (1994), pp. 725–736.

M. Franklin, K.K. Saluja, An Algorithm to Test Reconfigured RAMS, 7th Intl. Conf. on VLSI Design, Calcutta, India, 5–8 Jan. 1994, Comp. Soc. Press (1994) p. 359–364.

DIN V VDE 0801/A1:1994–10, Grundsätze für Rechner in Systmen mit Sicherheitsaufgaben, pp. 4–44.

IEEE Transactions on Computers, vol. C–27, No. 6, Jun. 1978, R. Nair et al, Efficient Algorithms for Testing Semiconductor Random–Access Memories, p. 572–575.

IEEE Transactions on Computers, vol. 43, No. 6, Jun. 1994, M. Franklin et al, Hypergraph Coloring and Reconfigured RAM Testing, pp. 725–736.

7ᵗʰ International Conference on VLSI Design, Jan. 1994, Calcutta India, An Algorithm to Test Reconfigured RAMS, pp. 359–364.

D. Rhein/H. Freitag, Mikroelektronische Speicher, Springer–Verlag, Wien New York, pp. 219–231.

*Primary Examiner*—John E. Barlow, Jr.
*Assistant Examiner*—Bryan Bui
*Attorney, Agent, or Firm*—Hill & Simpson

[57] ABSTRACT

Memory modules contain most of the transistors in a computer and thus constitute the most important components to be tested. In order, for example, to monitor the function of memory chips in applications which are critical for safety, it is necessary to carry out memory tests during ongoing operation of a computer. Furthermore, it is appropriate to make these memory tests possible under real-time conditions so that the application program can run without degradation. Highly effective memory tests enable stuck-at faults, connection faults and pattern-sensitive faults to be detected. In the method, the highly effective memory test is performed during ongoing operation of a computer while maintaining real-time conditions by dividing testing into a suitable combination of Franklin tests, which discover pattern-sensitive faults of adjacent memory cells, and of Nair tests, which discover connection faults in the incoming lines.

10 Claims, 2 Drawing Sheets

METHOD FOR TESTING A MEMORY CHIP, DIVIDED INTO CELL ARRAYS, DURING ONGOING OPERATION OF A COMPUTER WHILE MAINTAINING REAL-TIME CONDITIONS

BACKGROUND OF THE INVENTION

Computers are nowadays often used in application areas which require reaction within a specified time interval. These are referred to as real-time systems. In such systems, the computers can be integrated as "embedded systems" into the application or can be implemented separately therefrom, for example, as memory-programmable controllers or automation computers. Such applications require uninterrupted operation (high-availability systems or H systems). In other uses, in the event of a fault the controlled system must not be placed in a state which is critical for safety and which leads to human life or valuable objects being put at risk (failsafe systems or F systems). Both arrangements can also occur simultaneously (H+F systems).

In all three aforementioned modes of operation it is necessary for the computer to have possible ways of conducting self tests during ongoing operation. As a result, faults which occur can be localized and faulty components can possibly be detected even before they bring about a faulty state of the system. The computer components which are most at risk are those with most transistors, that is to say memories, processors and peripheral logic.

In computers in which a plurality of Mbytes of memory are used, the memory contains the most transistors and thus constitutes the most important component to be tested.

A distinction is made between three logical fault classes: stuck-at faults, connection faults and pattern-sensitive faults (DIN V VDE 0801/A1: 1994-10. Grundsätze für Rechner in Systemen mit Sicherheitsaufgaben (Principles for computers in systems with safety functions)). Depending on the degree to which these faults are discovered, a certain degree of effectiveness is allocated to the memory tests. In order to achieve a high level of effectiveness of a test, all the stuck-at faults, most of the connection faults and a large number of pattern-sensitive faults must be detected.

It is known that the test with the lowest level of complexity, and thus the shortest it execution time, is the test by Nair, Thatte and Abraham (R. Nair, S. M. Thatte, J. A. Abraham, Efficient Algorithms for Testing Semiconductor Random-Access Memories. IEEE Trans. on Comp. C-27, 6 (1978) 572–576), known as the Nair test for short.

In addition, Franklin tests (M. Franklin, K. K. Saluja, Hypergraph Coloring and Reconfigured RAM Testing, IEEE Trans. on Comp. 43, 6 (1994) 725–736; and M. Franklin, K. K. Saluja, An Algorithm to Test Reconfigured RAMS, 7th Intl. Conf. on VLSI Design, Calcutta, India, 5–8 Jan. 1994, Comp. Soc. Press (1994) 359–364), are known, which detect important pattern-sensitive faults even better than the Nair test when there is a relatively large amount of complexity with a high level of component integration. The Franklin tests can be considered as a logical extension of the Nair test, since they discover any triple fault, while the Nair test discovers only those triple faults in which all the memory cells involved are disjunctive. Thus, the Franklin tests, like the Nair test, can be classified as highly effective. All these tests have in common the fact that they do not require any knowledge of the physical cell architecture on the chip. The customary manufacturer's information is sufficient for correct execution.

Methods for testing a memory chip during ongoing operation are known from (D. Rhein, H. Freitag: Mikroelektronische Speicher (Microelectronic memories), SpringerVerlag Vienna, N. Y. 1992) and are designated in (D. Rhein, H. Freitag: Mikroelektronische Speicher (Microelectronic memories), Springer-Verlag Vienna, N.Y. 1992) as real-time data protection measures.

A method for testing a memory chip divided into cell arrays is known from (German Patent 40 11 987 C2). The memory chip in the known method is divided, in accordance with a matrix, into row areas and column areas (see FIG. 1).

SUMMARY OF THE INVENTION

The present invention is based on the problem that it must be possible to interrupt memory chip tests during ongoing operation under real-time conditions, so that the ability of the system to react (typically several ms) is not restricted (important: highly effective tests). The known highly effective memory tests do not have this property and therefore can only be used as switch-on tests in real-time computers. During ongoing operation, low-effectiveness tests have to be accepted. These then respectively test a small memory area in a prescribed time slot. No interruptions are permitted during them, that is, the interrupt mechanism of the computer is switched off.

The present invention permits a memory chip divided into cell arrays to be tested during ongoing operation of a computer while maintaining real-time conditions. At the same time, high effectiveness accompanied by a test-interrupt capability is ensured.

The memory chip can be divided into individual cell arrays which are arranged in accordance with a matrix. This matrix is divided into row areas and column areas, these each having at least one cell array. A cell row is determined by an individual row of a row area and a cell column is determined by an individual column of a column area.

The method for testing the memory chip is structured as follows:

A first row area is selected. If the content of this first row area is allocated to an application program, the content must be copied over into another, free, second row area and the addressing of the application program must be appropriately modified via the second row area. A Franklin test is carried out in each case for all the cell arrays of the first row area. Two cell arrays are selected from the row area. A Nair test is carried out on any storage cell row of the two selected cell arrays. In order to test all the possible combinations of two cell arrays, the Nair test of the last step is repeated with another pair of cell arrays in each case. A Nair test is carried out on any storage cell column, limited to the selected, first row area. The individual steps of the method described are carried out for all the row areas of the memory chips.

The second part of the method proceeds as follows:

A pair of row areas is selected. If one of the row areas or both row areas are allocated to an application program, the content of the one row area or of both row areas is copied over into one or two free row areas and the addressing of the application program is appropriately modified for each copied-over row area. In each case any one storage cell column is selected from the two selected row areas. A Nair test is carried out on the two selected storage cell columns. The individual steps of this second part are carried out with a different pair of row areas in each case until all the possible combinations of two row areas have been run through.

The Franklin test in the first part of the method tests for dynamic, pattern-sensitive faults which occur as a result of connections between adjacent storage cells. These faults are detected by means of Franklin tests without the physical assignment of the cells of the logical addresses having to be known. The Nair tests in the first and second parts of the method test for static faults (short-circuits) and connections between lines.

It is advantageous to allow no interrupts during the execution of the Nair tests. If the Nair tests are carried out exclusively, side effects due to main memory accesses can be excluded.

In addition, it is advantageous to test a plurality of memory chips of an entire memory simultaneously by means of parallel tests. For this purpose, the same data are written into all the memory chips and the same data are read out of all the memory chips.

Furthermore, in computer systems which have EDC mechanisms, it is advantageous to determine, by interrogating the EDC controller, whether a memory fault has been corrected and, if appropriate, to classify the type of fault. Assuming that the fault can be reproduced, it is possible to differentiate between stuck-at faults, connection faults and pattern-sensitive faults. The fault is classified as a stuck-at fault if the storage cell has a different value than that directly written into it. The other two faults, connection faults and pattern-sensitive faults are discovered in accordance with the method of the present invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
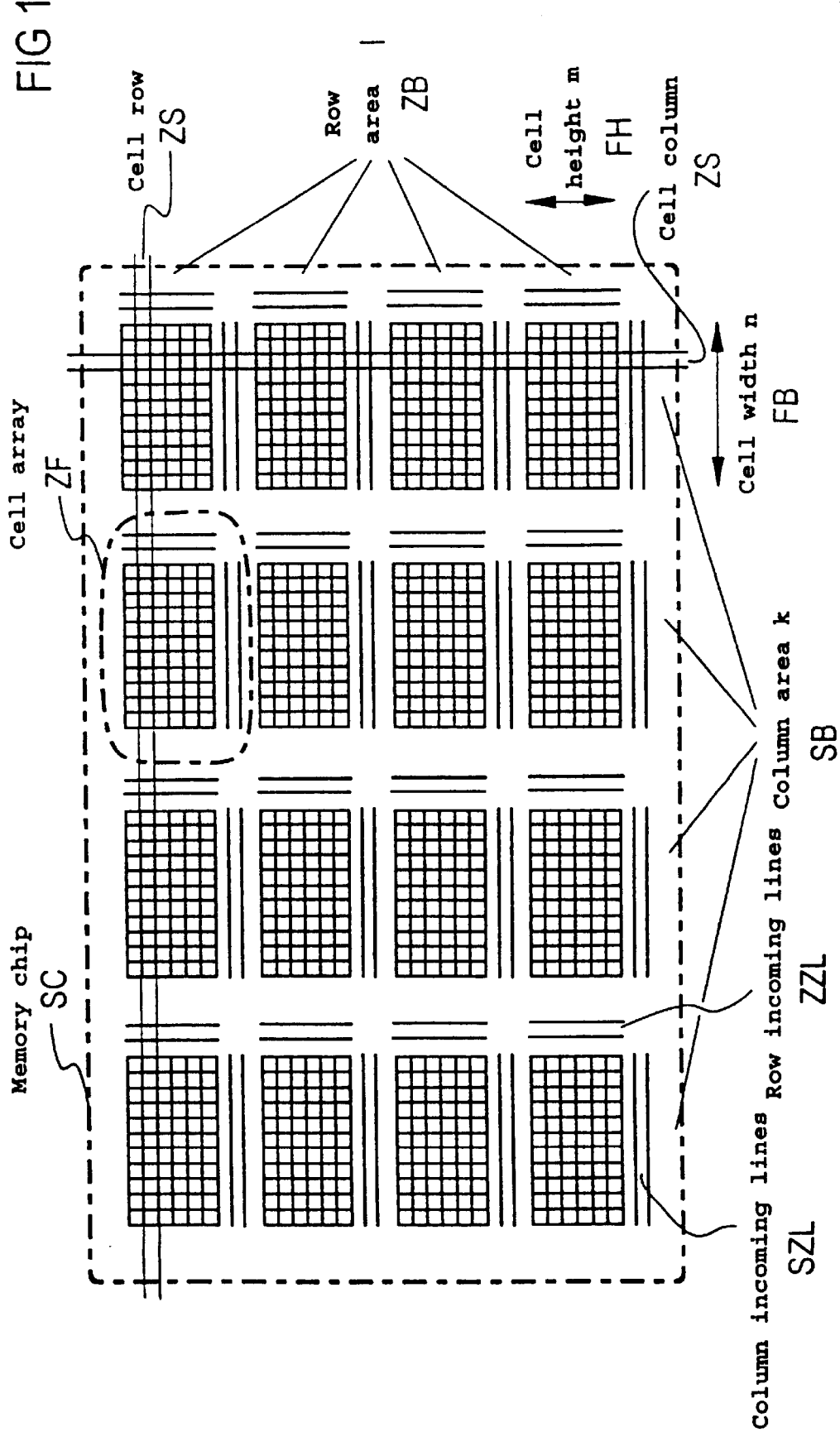
FIG. 1 is a drawing illustrating the physical organization of a memory chip.

FIG. 1 represents a possible physical organization of a memory chip SC. On it cell arrays ZF are arranged into row areas ZB and column areas SB in the shape of a matrix. A storage cell row ZZ is determined by an individual row of a row area ZB and a storage call column ZS is determined by an individual column of a column area SB. An individual cell array ZF has the array width FB n and the array height FH m. Furthermore, there are row incoming lines ZZL and column incoming lines SZL.

Figure 2:
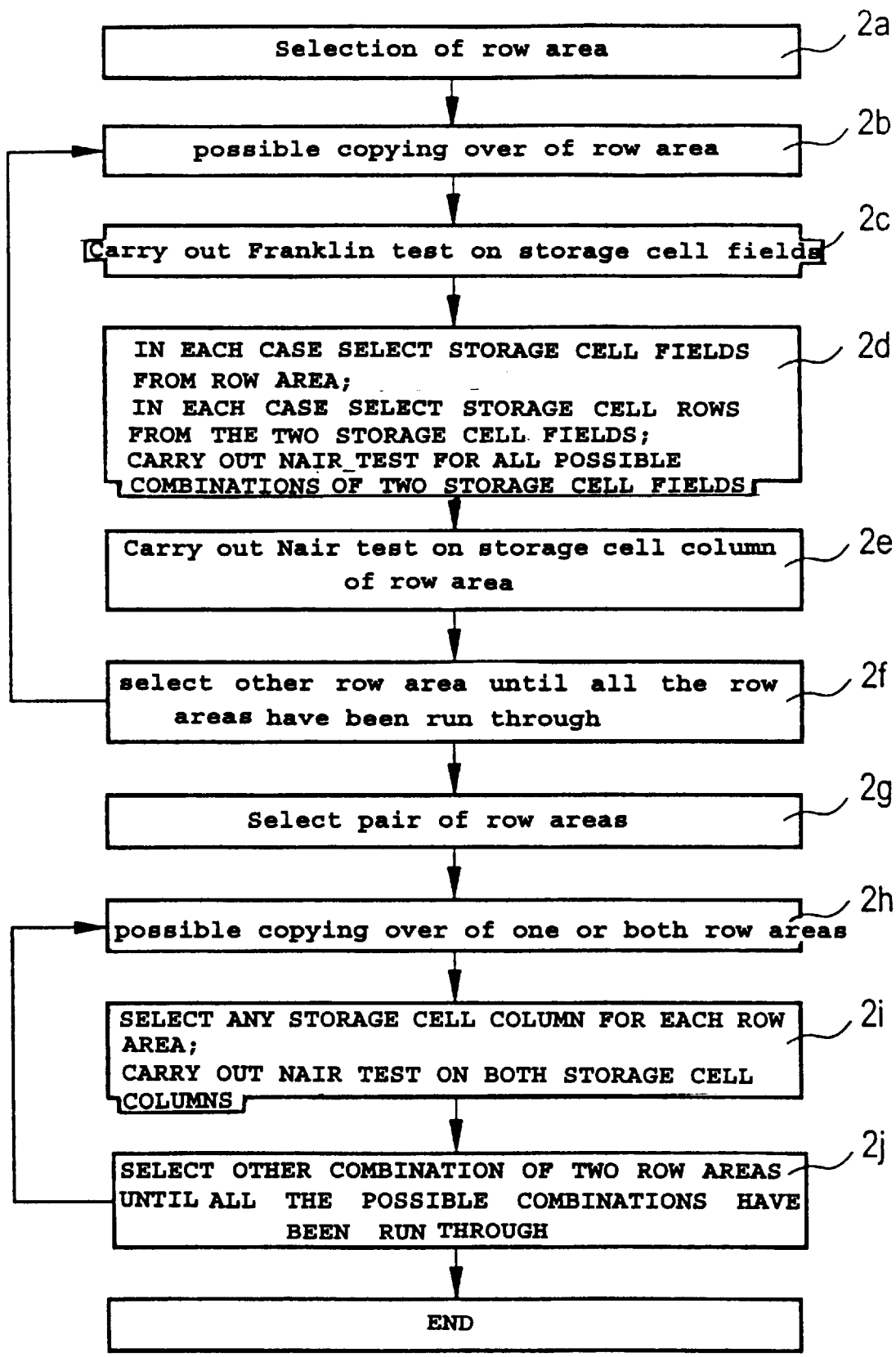
FIG. 2 shows a flowchart in which the individual method steps are represented.

FIG. 2 represents the individual method steps of the method according to the present invention. For a highly effective memory test it is important to detect, dynamic pattern-sensitive faults which occur as a result of connections between adjacent storage cells, and static faults which occur as a result of connections between lines. In order to be able to carry out highly effective memory tests during ongoing operation under real-time conditions, a two-stage method is proposed which firstly investigates the dynamic pattern-sensitive faults, then the static faults occurring as a result of column incoming lines and/or row incoming lines in a row area, carries this out iteratively for all the row areas, and in a second step tests the row incoming lines of its own row area for all the possible combinations of two row areas with respect to other row incoming lines. This method, which is also described in FIG. 2, in explained in detail below.

Firstly a first row area is selected (see FIG. 2, step 2a). Should the content of this first row area be allocated to an application program, this content is copied over into another free row area. The addressing of the application program has to be changed appropriately for the row area (step 2b). In each case, a Franklin test is carried out for all the cell arrays of the first row area (step 2c). Then, two cell arrays are selected from the row area. Any storage cell row of the cell arrays in question is selected in each case. Connections between column incoming lines are tested by carrying out a Nair test for all the possible combinations of two cell arrays of the row area, it being sufficient to carry out the Nair test on the selected storage cell rows in each case (step 2d). an Connections between row incoming lines are tested by carrying out a Nair test on any storage cell column of the selected, first row area (step 2e). Then, as long as all the row areas have still not been run through, another row area is selected and the test jumps to step 2b (step 2f). When all the row areas have been tested individually in accordance with the method described above, a pair of row areas is selected (step 2g). If an application program requires memory of a row area or of both row areas, each occupied row area must be copied over into a free row area and the addressing of the application program must be appropriately modified for each copied-over row area (step 2h). Then, in each case any storage cell column is selected from the two selected row areas. A Nair test is carried out on both selected storage cell columns (step 2i). As a result, fault checking for static faults and connections between lines is carried out for row incoming lines between row areas. As long as all the possible combinations of two row areas have not yet been selected, a new possible combination of two row areas is selected (step 2j) and the test jumps to step 2h.

The Franklin test is more complex than the Nair test but when there in a high level of component integration the detection of important pattern-sensitive faults is even better. Franklin tests are a logical extension of the Nair test, since they discover any triple faults, whereas the Nair test only discovers triple faults in which all the involved memory cells are disjunctive. Since the memory test in accordance with the method according to the present invention is to be carried out during ongoing operation of the computer and under real-time conditions, the more complex Franklin test is applied only to individual cell arrays. In such cases, the test is intended to discover dynamic, pattern-sensitive faults. The static faults (short-circuits) and connections between lines are detected with the method according to the present invention by means of Nair tests. Franklin tests can also be used to discover the static faults if the time required, which is due to the greater complexity of the Franklin tests, is acceptable.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for testing a memory chip, divided into cell arrays, during ongoing operation of a computer while maintaining real-time conditions, the memory chip being divided into row areas and column areas in accordance with a matrix, each of said areas having at least one cell array and a storage cell row determining an individual row of a row area and a storage cell column determining an individual column of a column area, comprising the steps of:

a) selecting a first row area;

b) copying, if a content of the first row area is allocated to an application program, said content into another free, second row area and modifying addressing of the application program for the second row area;

c) carrying out a Franklin test for each cell array of the first row area;

d) selecting two cell arrays from the row area;

e) carrying out a Nair test on any storage cell row of the two selected cell arrays;

f) reporting steps d) to e) with another pair of cell arrays until all possible combinations of two cell arrays have been run through;

g) carrying out a Nair test on any storage cell column, restricted to the selected, first row area;

h) carrying out steps b) to g) for all row areas of the memory chip;

i) selecting a pair of row areas;

j) copying, if at least one of the row areas is allocated to an application program, a content of the at least one row area into at least one free row area and modifying addressing of the application program for each copied-over row area;

k) selecting in each case any one storage cell column from the two selected row areas;

l) carrying out a Nair test on the two selected storage cell columns;

m) carrying out steps j) to l) with a different pair of row areas until all possible combinations of two row areas have been run through.

2. The method according to claim 1, wherein no interrupts are permitted during execution of the Nair test.

3. The method according to claim 1, wherein a plurality of memory chips of an entire memory are tested simultaneously by parallel testing, in which common data is written into all the memory chips and wherein the common data is read out of all the memory chips.

4. The method according to claim 1, wherein for classifying faults in computer systems, which have EDC mechanisms, in which occurrence of a fault is determined by interrogating an EDC controller, and wherein a fault is classified, assuming the fault can be reproduced, by distinction between stuck-at faults, if a storage cell has a different value than a value directly written into the storage cell, connection faults, if steps e) to g) or l) to m) discover a fault, and pattern-sensitive faults, if step c) discovers a fault.

5. A method for testing a memory chip, divided into cell arrays, during ongoing operation of a computer while maintaining real-time conditions, the memory chip being divided into row areas and column areas in accordance with a matrix, each of said areas having at least one cell array and a storage cell row determining an individual row of a row area and a storage cell column determining an individual column of a column area, comprising the steps of:

a) selecting a first row area;

b) copying, if a content of the first row area is allocated to an application program, said content into another free, second row area and modifying addressing of the application program for the second row area;

c) carrying out a Franklin test for each cell array of the first row area;

d) selecting two cell arrays from the row area;

e) carrying out a Nair test on any storage cell row of the two selected cell arrays;

f) reporting steps d) to e) with another pair of cell arrays until all possible combinations of two cell arrays have been run through;

g) carrying out a Nair test, without interruption, on any storage cell column, restricted to the selected, first row area;

h) carrying out steps b) to g) for all row areas of the memory chip;

i) selecting a pair of row areas;

j) copying, if at least one of the row areas is allocated to an application program, a content of the at least one row area into at least one free row area and modifying addressing of the application program for each copied-over row area;

k) selecting in each case any one storage cell column from the two selected row areas;

l) carrying out a Nair test on the two selected storage cell columns;

m) carrying out steps j) to l) with a different pair of row areas until all possible combinations of two row areas have been run through.

6. The method according to claim 5, wherein a plurality of memory chips of an entire memory are tested simultaneously by parallel testing, in which common data is written into all the memory chips and wherein the common data is read out of all the memory chips.

7. The method according to claim 5, wherein for classifying faults in computer systems, which have EDC mechanisms, in which occurrence of a fault is determined by interrogating an EDC controller, and wherein a fault is classified, assuming the fault can be reproduced, by distinction between stuck-at faults, if a storage cell has a different value than a value directly written into the storage cell, connection faults, if steps e) to g) or l) to m) discover a fault, and pattern-sensitive faults, if step c) discovers a fault.

8. A method for testing a memory chip, divided into cell arrays, during ongoing operation of a computer while maintaining real-time conditions, the memory chip being divided into row areas and column areas in accordance with a matrix, each of said areas having at least one cell array and a storage cell row determining an individual row of a row area and a storage cell column determining an individual column of a column area, comprising the steps of:

a) selecting a first row area;

b) copying, if a content of the first row area is allocated to an application program, said content into another free, second row area and modifying addressing of the application program for the second row area;

c) carrying out a Franklin test for each cell array of the first row area;

d) selecting two cell arrays from the row area;

e) carrying out a Nair test on any storage cell row of the two selected cell arrays;

f) reporting steps d) to e) with another pair of cell arrays until all possible combinations of two cell arrays have been run through;

g) carrying out a Nair test on any storage cell column, restricted to the selected, first row area;

h) carrying out steps b) to g) for all row areas of the memory chip;

i) selecting a pair of row areas;

j) copying, if at least one of the row areas is allocated to an application program, a content of the at least one row area into at least one free row area and modifying addressing of the application program for each copied-over row area;

k) selecting in each case any one storage cell column from the two selected row areas;

l) carrying out a Nair test on the two selected storage cell columns;

m) carrying out steps j) to l) with a different pair of row areas until all possible combinations of two row areas have been run through;

classifying a fault, assuming the fault can be reproduced, by distinction between stuck-at faults, if a storage cell has a different value than a value directly written into the storage cell, connection faults, if steps e) to g) or l) to m) discover a fault, and pattern-sensitive faults, if step c) discovers a fault.

9. The method according to claim 8, wherein no interrupts are permitted during execution of the Nair test.

10. The method according to claim 8, wherein a plurality of memory chips of an entire memory are tested simultaneously by parallel testing, in which common data is written into all the memory chips and wherein the common data is read out of all the memory chips.

* * * * *